Figure 4:
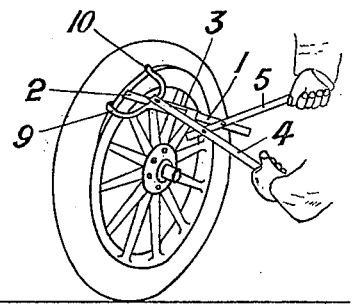

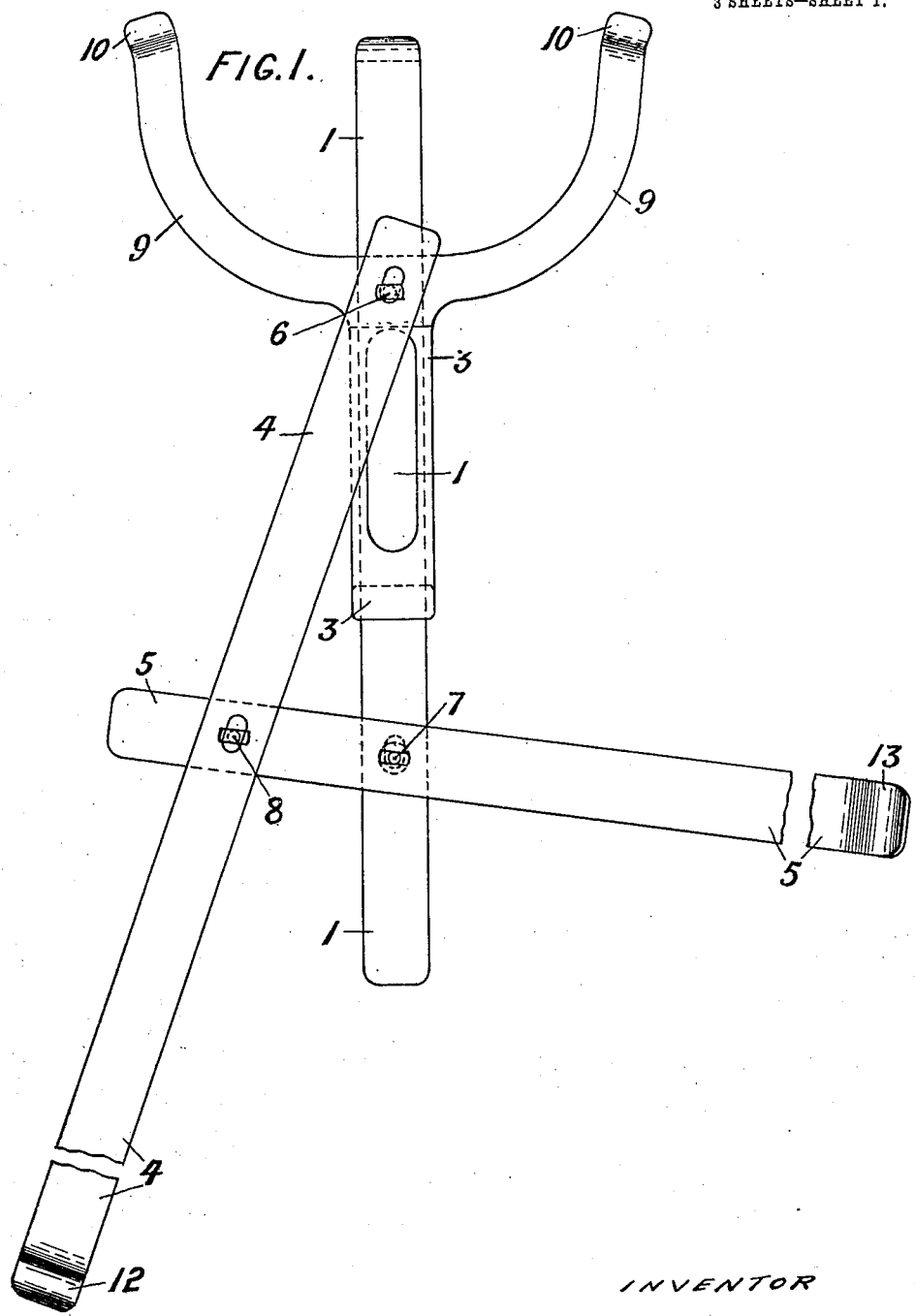

W. JAMES.
TIRE TOOL.
APPLICATION FILED SEPT. 14, 1907.
913,897.
Patented Mar. 2, 1909.
3 SHEETS—SHEET 2.
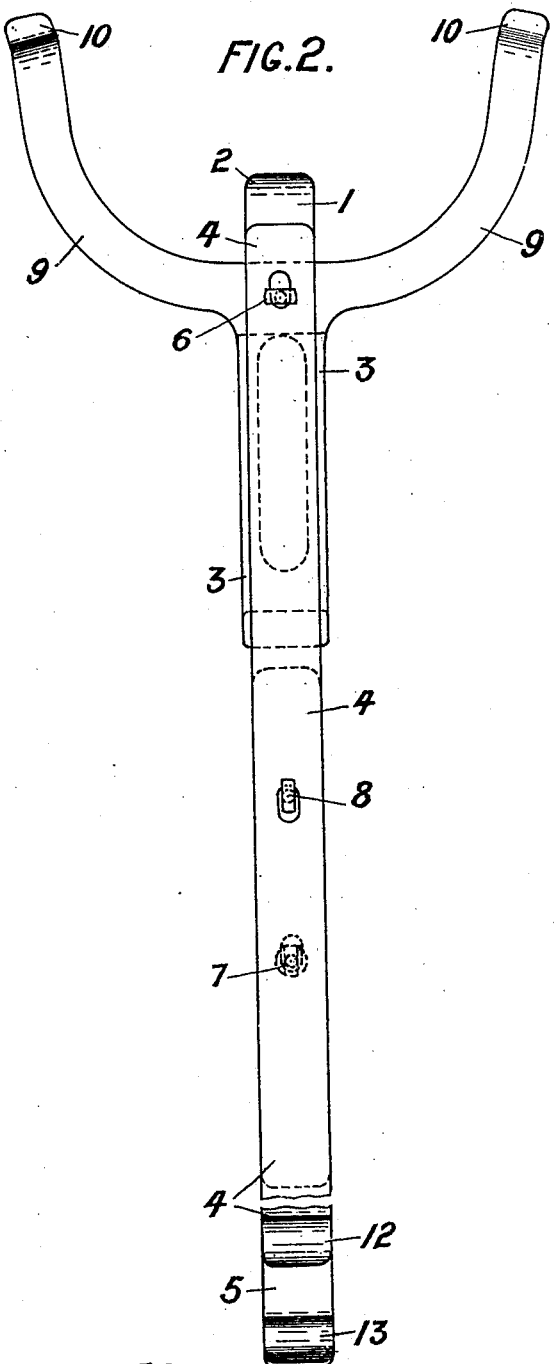
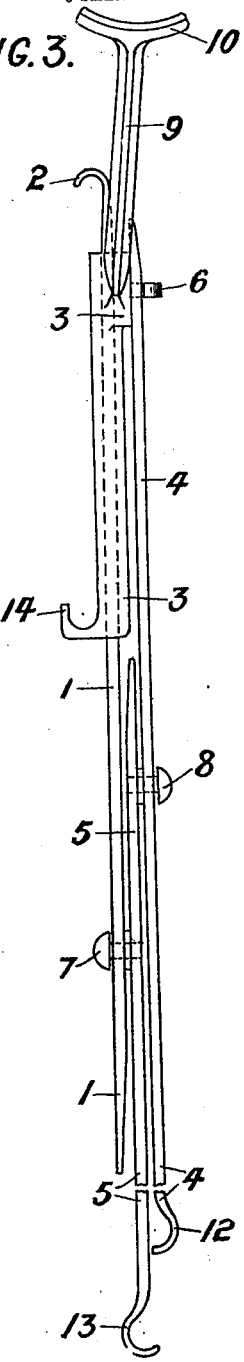
WITNESSES
W. P. Burke
Lawrence Hajek
INVENTOR
William James
BY Wm Wallace White
ATTY

W. JAMES.
TIRE TOOL.
APPLICATION FILED SEPT. 14, 1907.

913,897.

Patented Mar. 2, 1909.
3 SHEETS—SHEET 3.

WITNESSES
W. P. Burk
Lawrence Hajek

INVENTOR
William James
BY Wm Wallace White
ATT'Y

UNITED STATES PATENT OFFICE.

WILLIAM JAMES, OF BIRKENHEAD, ENGLAND.

TIRE-TOOL.

No. 913,897.   Specification of Letters Patent.   Patented March 2, 1909.

Application filed September 14, 1907. Serial No. 392,930.

*To all whom it may concern:*

Be it known that I, WILLIAM JAMES, a subject of the King of England, residing at Birkenhead, in the county of Chester, England, have invented new and useful Improvements in Tire-Tools, of which the following is a specification.

This invention has reference to appliances or tools for manipulating tires, and primarily pneumatic tires of self-propelled vehicles, for obtaining access to the interior portion of same, and to the rim of the wheel in connection with which they are used; and in connection with pneumatic tires used on motor-cars, it has for its object and effect to provide an appliance or instrument by which the outer cover can be pressed and held away from the rim, so that ready access can be had to the pneumatic tube within the cover, to enable the air valve tube or fitting together with the tube to be readily withdrawn from the rim or felly, and put in position; and also the security bolts or fasteners which are usually employed at points round the rim to be removed and placed in position, and adjusted, at will, and easily.

According to this invention, the tool comprises a part adapted to be engaged with or hooked onto the rim edge, and a part adapted to engage the edge of the cover; and these parts have sliding or longitudinal movement in relation to each other, so that when the hook or engaging part is engaged with the rim edge, and the tool is operated by the hand actuating parts, it will move outwards the other part which engages with the inner edge of the tire cover, and press it away from the rim, so as to leave a large space between the rim and the cover edge, and thereby enable access to be had by way of this space to the interior of the cover and to the rim and parts within. And it is not only arranged to do this, but it is also constructed and adapted that when so engaged, it can be moved to an angle or oblique plane to the plane of the wheel. And furthermore, when the tool has been moved and operated, and the edge of the cover pressed away from the rim edge, it will hold it there of itself; that is, it will retain this position, without being held by the user, so that both hands of the user are free to operate upon the tube and tire in any way that may be desired.

In some cases, if desired, the manipulating part connected with the rim engaging part, and the manipulating part connected with and for operating the cover edge pressing part, may be provided with a catch or engaging means by which they are held together when brought together.

Figure 5:
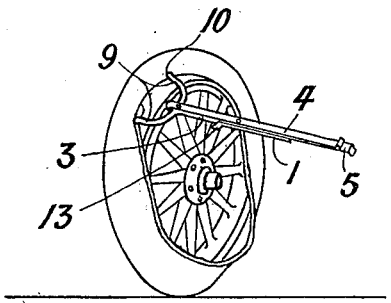
Figure 6:
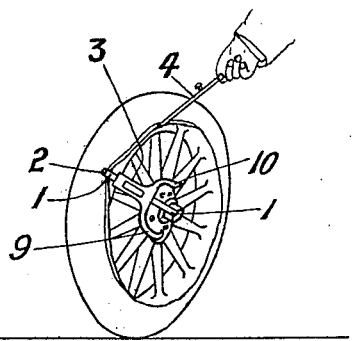

The invention will be further described with the aid of the accompanying drawings which illustrate it; Figure 1 being a front view showing it in the open position; Fig. 2 is a front view showing it closed; and Fig. 3 is a side view. Figs. 4, 5, and 6 are perspective views showing the instrument in use in various positions.

Referring now to these drawings, 1 represents the part which is adapted to hook onto the rim edge of the wheel, it being provided with a downwardly bent-over engaging hook 2 at its upper end; while 3 represents the part adapted to engage with the cover. These parts have sliding or longitudinal movement in relation to each other; namely, the part 1—which consists of say a steel or other metal bar—slides in the stem or body of the part 3, which is made of flat tubular form to receive it. And these two parts are moved in relation to each other longitudinally by two lever bars 4 and 5, one bar 4,—the longer—being pivoted at 6 to the upper part of the stem of the part 3, and the other lever bar 5 is pivoted at 7 to the lower end of the hook bar 1, and at its other end at 8, to the lever bar 4.

The distance between the fulcrum 7 and the outer connection joint 8 is small in relation to the length of the lever 5 below the fulcrum 7; and the lower end portion of this lever is grasped by one hand, while the lower end of the other lever 4 is grasped by the other hand. The cover engaging part 3 has a horn 9, extending out on each side of its tubular stem, and at the extremities of these horns are concave-shaped bifurcations 10, and these are adapted to bear and act upon the edge of the tire cover in applying the instrument.

In use, when it is desired to obtain access to the interior portion of the tire for any purpose, the instrument is applied as shown in Fig. 4 to ease the cover, namely, the hook 2 is hooked over the edge of the rim of the tire, with the bifurcated pressing portions 10 bearing against the tire cover edge. Then the two ends of the levers 4, 5, are pressed toward one another, with the result that the cover engaging part 3 is moved toward the tire cover, sliding upon the bar 1, and as it is moved inward, the power of the levers increases, due to the relative position of the joints 6, 8, 7, and the changing of the relative positions of these joints, as the pressing in operation proceeds.

In the extreme position of the parts, the lever arms and the parts will lie in a straight line parallel with each other, as shown in Fig. 2. When the cover edge has been eased all round by the tool, it is then taken to pieces as hereinafter described, the different bar levers being used to lever the cover edge off and over the rim. Then to get at the inner tube, the parts are put together again, and applied to the rim and cover in the same manner as above described, and the levers and parts brought into line as shown in Figs. 2 and 5. In this position, the parts will of themselves remain without holding any of them at all, as indicated in Fig. 5, the cover edge being pushed well away from the rim, leaving a large space for gaining access to the inner tube for any purpose, such as for taking out the inner pneumatic tube, putting it back, inspecting parts of or connected with it, gaining access to the valve, or for any other object. Further, as above stated, the tool is such that when it is so engaged with the rim and tire cover, it can be moved to any angle or oblique plane to the plane of the wheel. To put back the cover into the rim, the tool is taken to pieces again, and the parts used as ordinary levers for levering in the edge, the last operation and use of parts being shown in Fig. 6.

With regard to the pivots 6 and 8, these are made by fitting a T-headed stud into the stem of the part 3, and fitting a similar T-headed stud in the end of the lever bar 5, and providing longitudinally slotted holes in the bar 4, slightly longer than the heads of the T studs. By these means, when the two bars are in line, the stud of the pivot 8 will lie lengthwise, the sides being parallel with the slots, so that the bar 4 can be lifted away and out of contact with 5; and then by turning this bar at right angles to the stem of the part 1, the slot at the upper end will become parallel with the transversely disposed stud head at 6, and it can be lifted off this stud, and it will then be quite detached. And likewise, when the bars 1 and 5 are in line, the stud 7 can be detached, that is, drawn up from the longitudinal slot in 1 and detached, and hence all the parts can be detached. These bars, therefore, can be used as above described, for ordinary tire cover levers, for taking it out of the rim, and putting it in, namely, one end of the bars will be round pointed, these ends being used for levering the cover edge out of the rim, and the other ends will be provided with a hook at 9 and 13, respectively, for the purpose of engaging the rim when levering by means of these levers the edge of the tire cover into the rim (see Fig. 6); and for holding a part of the edge of the cover at this last stage of insertion, while this levering in is being effected, the part 3 is hung from the hook 14 on the inner end of its stem, to the rim of the wheel, and with the bar 1 projecting up outside the tire as shown in Fig. 6—the horns 3 lying against the side of the wheel as shown. Thus it will be seen that various parts of the instrument can be used for not only the primary purpose, but also for a secondary purpose in connection with the taking off and putting on of tires, and their general manipulation.

What is claimed is:—

1. A tool for manipulating tires, comprising a part having a hooked end, the hook of which is adapted to engage the edge of a tire rim, a part adapted to move parallel with and in connection with the said former part, having engaging parts on its outer end, adapted to engage with the edge of the tire; a bar secured to and adapted to move circularly on the part adapted to engage with the side of the tire; and a bar secured to and adapted to move circularly on the part adapted to engage with the rim, and with the bar secured to the part for engaging the side of the tire, substantially as set forth.

2. A tool for manipulating tires comprising a bar 1 having a hooked end, a part 3 within which said bar 1 slides, horns on said part 3 having tire engaging parts at the ends, a bar 4 movably secured to the part 3, a bar 5 movably secured to the bar 1 and to the bar 4, so that by moving the bars 4 and 5 the bar 1 and part 3 are moved longitudinally in opposite directions.

3. In a tool for manipulating tires, the combination of a bar 1, having a hooked end 2; a part 3, within which the said bar 1 slides, and having a horn 9 extending out on either side of the body of said part 3, and having engaging parts 10 at their ends, and two movable handles 4, 5, one connected with the part 3, and the other connected with the part 1, and also connected together, substantially as set forth.

4. An appliance for manipulating tires comprising in combination the bar 1 with a hook 2 on one end; the part 3 sliding on the bar 1, having the horns 9 one on each side of the bar 1; the hand lever 4 pivoted at 6 at one end to the part 3; the hand lever 5 pivoted at 7 to the bar 1; and a joint 8 connecting one end of the lever 5, and the lever 4 together; as set forth.

In testimony whereof I have signed my name to this specification in the presence of two subscribing witnesses.

WILLIAM JAMES.

Witnesses:
SOMERVILLE GOODALL,
WALTER MONTAGU HARRISON.